United States Patent [19]

Jaumann

[11] Patent Number: 4,579,436
[45] Date of Patent: Apr. 1, 1986

[54] TRIPOD FOR MOUNTING FILM AND TELEVISION CAMERAS ETC.

[75] Inventor: Leonhard Jaumann, Munich, Fed. Rep. of Germany

[73] Assignee: Sachtler GmbH, Garching, Fed. Rep. of Germany

[21] Appl. No.: 753,175

[22] Filed: Jul. 9, 1985

[30] Foreign Application Priority Data

Jul. 10, 1984 [DE] Fed. Rep. of Germany ....... 3425374

[51] Int. Cl.⁴ ............................................. G03B 17/00
[52] U.S. Cl. .................................... 354/293; 248/179; 248/187
[58] Field of Search ............... 248/179, 178, 177, 187; 354/293, 81

[56] References Cited

U.S. PATENT DOCUMENTS

| | | | |
|---|---|---|---|
| 4,174,900 | 11/1979 | Ina | 354/293 |
| 4,249,817 | 2/1981 | Blau | 354/293 |
| 4,324,477 | 4/1982 | Miyazaki | 354/293 |
| 4,457,610 | 7/1984 | Kawazoe | 354/293 |

FOREIGN PATENT DOCUMENTS 1891958 2/1964 Fed. Rep. of Germany .

Primary Examiner—Ramon S. Britts
Assistant Examiner—Ramon O. Ramirez
Attorney, Agent, or Firm—Hayes, Davis & Soloway

[57] ABSTRACT

A tripod (1) having a semispherical mounting tray (8) for mounting the semispherical portion (29) of a tripod head (7) for a film or television camera. The tripod head (7) has at its bottom a threaded pin (30) screwed with a threaded coupling (16) of a fastening element (10), whereby the semispherical portion (29) of the tripod head (7) can be clamped in the mounting tray (8). To be able easily to position horizontally the clamped tripod head (7), the fastening element (10) is made of several parts (11, 13, 14, 16, 19), the individual parts being compressed by a cup spring stack (13). By means of an eccentric (23, 24, 25) the cup spring stack (13) can be compressed to that the semispherical portion (29) of the tripod head can be moved with the screwed on threaded coupling (16) for leveling. If the eccentric is then forced out, the tripod head is locked in the new position by spring pressure.

5 Claims, 3 Drawing Figures

TRIPOD FOR MOUNTING FILM AND TELEVISION CAMERAS ETC.

This invention relates to tripods comprising a semispherical dish-shaped mounting tray for a tripod head having a semispherical bottom portion for carrying a film or television camera etc. and in the bottom area of said mounting tray a fastening element which has a treaded coupling for engagement with a threaded pin at the bottom of said tripod head and for pressing said tripod head in said mounting tray.

Tripods of this kind serve to mount conventionally hydraulically dampened pivotable tripod heads which have at their lower end a semispherical portion containing a hydraulic dampening element. A threaded pin is situated at the bottom of the semispherical portion. The semispherical portion of the tripod head is inserted in a mounting tray of the tripod and clamped in the mounting tray by a fastening element which has a threaded coupling. During this clamping operation the tripod head must be leveled, that is, horizontally positioned. For this purpose there is provided, as a rule, directly on the tripod head a level gauge the level of which must be adjusted to a zero point indicative of the horizontal plane. When this has been done, the tripod head is firmly clamped in the mounting tray.

This leveling must always be repeated after changing the position of the tripod. For this purpose, the threaded coupling of the fastening element must again be unscrewed, then the tripod head must be tilted, as a rule with both hands, into the horizontal position, and thereafter the threaded coupling must again be screwed on.

These operations are unduly complicated and this invention is based on the problem of providing a tripod of the kind in question with which the leveling of the tripod head is substantially simplified.

According to the invention there is provided a tripod comprising a semispherical dish-shaped mounting tray for a tripod head having a semispherical bottom portion for carrying a film or television camera etc. and in the bottom area of said mounting tray a fastening element which has a treaded coupling (16) for engagement with a threaded pin at the bottom of said tripod head and for pressing said tripod head in said mounting tray, the improvement comprising said fastening element (10) being situated in a downwardly oriented attachment (9) of said mounting tray (8) consisting, in sequence, of a pressure member (11) held on the bottom of said mounting tray (8) and having a central aperture (26), a mechanical energy reservoir (13) having a central aperture (27), a spacer (14) having a central aperture (28) and a convex underface (15), the threaded coupling (16) having a concave surface (18) resting on said convex underface (15) of said spacer (14), a sleeve (19) that surrounds said threaded coupling (16) and supports said spacer (14) on its lower edge (20), and a rotatable eccentric (23, 24, 25) acting upon the lower edge (22) of said sleeve (19) and mounted in said attachment (9) of said mounting tray (8).

Accordingly a rigid fastening element having a threaded coupling that clamps the semispherical portion of the tripod head in the mounting tray is not used. The invention utilizes a fastening element into which there is incorporated a mechanical energy reservoir, preferably a cup spring stack, by which is applied the actual clamping force for the tripod head. Said cup spring stack can be compressed by an eccentric so that the fastening of the tripod head is loosened and the latter can easily be pivoted toward all sides and at the same time leveled again. The rotating motion is simplified by the fact that the sliding planes that take part there have within the fastening element corresponding spherical surfaces. If the tripod head is again leveled, then the eccentric is pivoted again to the rotating position so that the cup spring stack again braces the whole fastening element together with the tripod head.

The eccentric preferably has a shaft supported about a horizontal axis in an attachment on the mounting tray of the tripod. On the shaft are provided two eccentric ramps that act upon the lower edge of the sleeve toward two opposite sides. The shaft is tilted by means of a handle such as a strap-shaped handle, whereby the tripod head is released and can now be leveled again. If the tripod head is brought to the horizontal position, then the strap-shaped handle is released and thus the tripod head is clamped.

The invention is explained in detail in one embodiment, by way of example, having reference to the accompanying drawings, in which.

Figure 1:
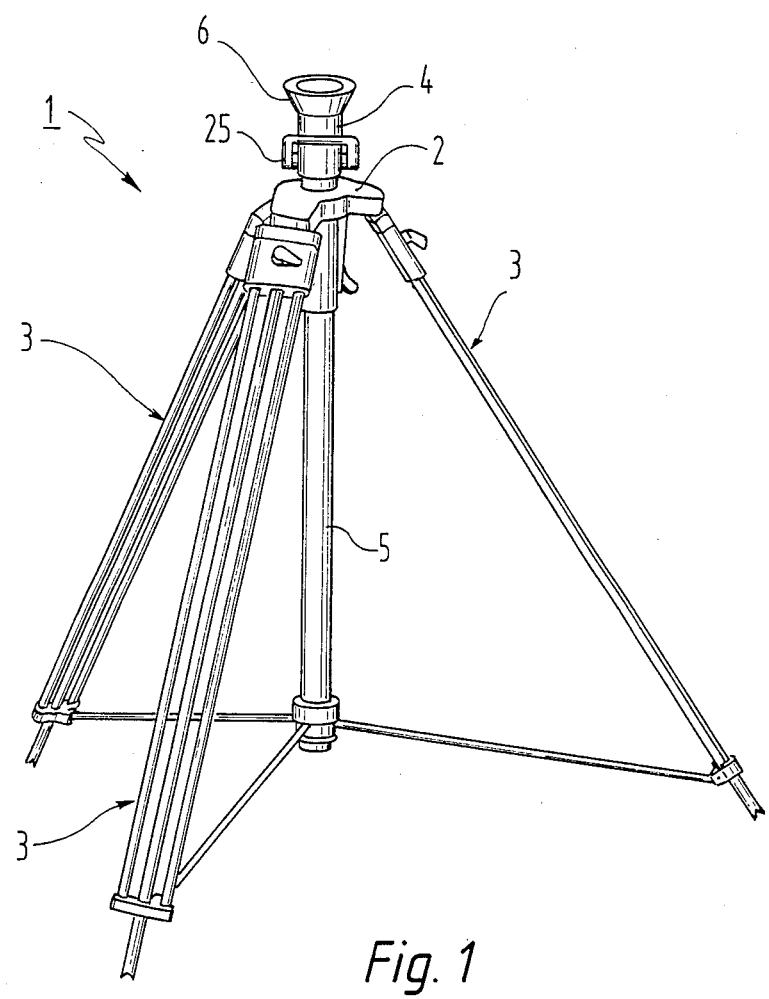
FIG. 1 is an illustration in perspective of a tripod for mounting a tripod head for a film or television camera.

A tripod 1 has three tripod legs of adjustable length pivotably hinged on a carrier ring 2 and a vertical central column 4 vertically movably supported in a solid sleeve 5 that extends downwardly from the carrier ring 2. On the upper free end is situated on the central column 4 a mounting device 6 for a tripod head 7 (indicated in ghost in FIG. 2).

The mounting device 6 comprises an internally semispherically shaped mounting tray 8, which continues downwardly in a cylindrical attachment 9 firmly connected with the central column 4. In the attachment 9 is situated a clamping assembly 10, seen in FIG. 2 which, from the top down, is consecutively comprised of several parts, namely, a plate-like pressure member 11 which is held in the attachment 9 by means of a snap ring 12 or the like, a cup spring stack 13, a spacer 14 having a lower convex spherical underface 15 with a threaded coupling 16 having a central thread 17 and an upper concave surface 18 that rests upon the convex face 15. The threaded coupling 16 is surrounded by a sleeve 19 on the upper edge of which rests the spacer 14 in a circular recess 20 thereof. On the lower edge of the sleeve 19 is provided a circular groove 21 in which rests a hardened washer 22. Said washer 22 supports itself on a shaft 23 mounted in the attachment 9. In the area of the washer 22 the shaft 23 has two eccentric ramps 24 of small ramp height. The opposite ends of the shaft 23 are pivoted in attachment 9 and project from the attachment 9 where they are connected with a strap-shaped handle 25 (see also FIG. 3). The pressure member 11 of the cup spring stack 13 and the spacer 14 have each a central aperture 26, 27 or 28 of substantially from double to triple the inside diameter of the thread 17 in the threaded coupling 16.

Figure 2:
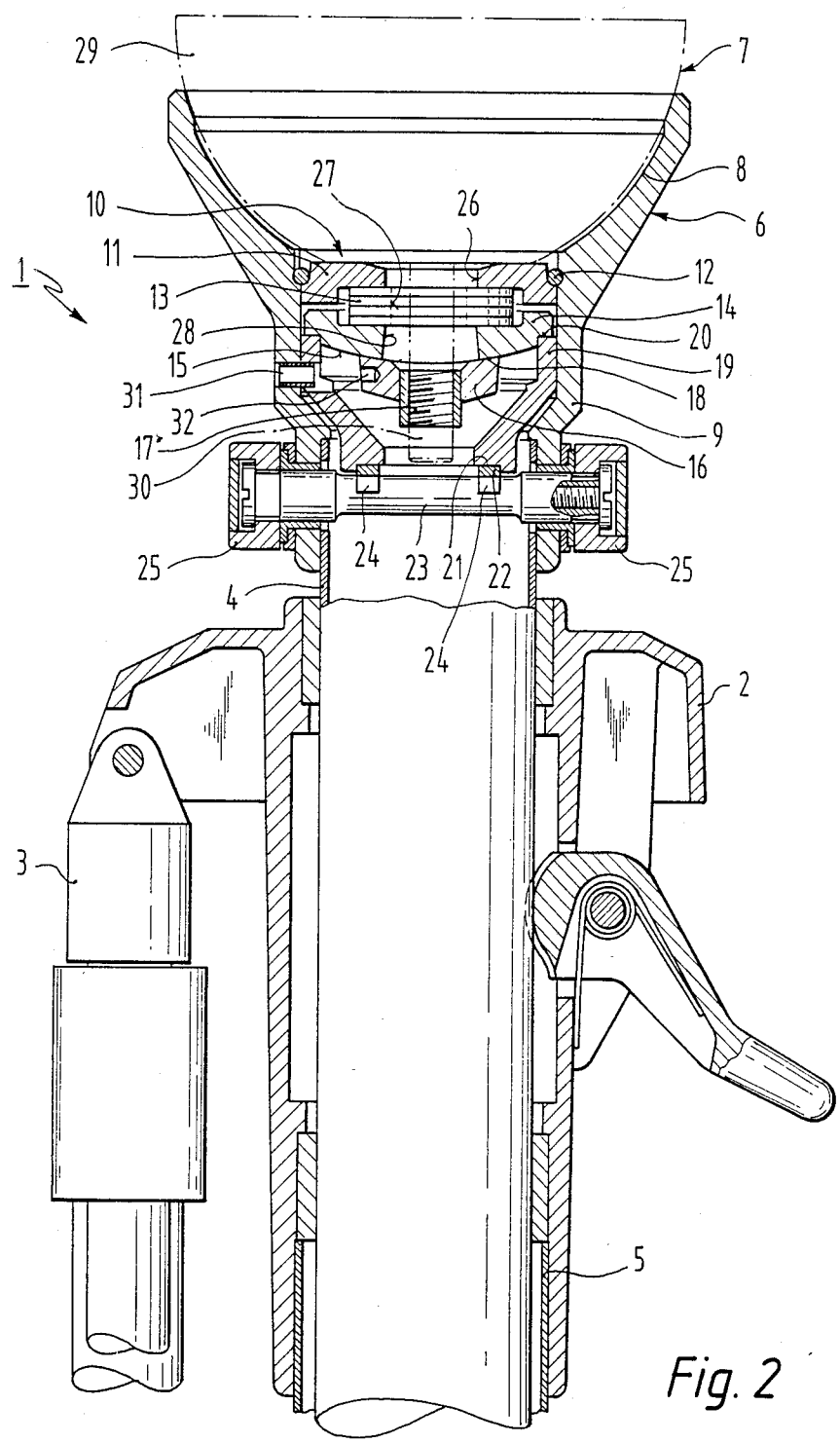
FIG. 2 is a section through the upper portion of the tripod shown in FIG. 1.
Figure 3:
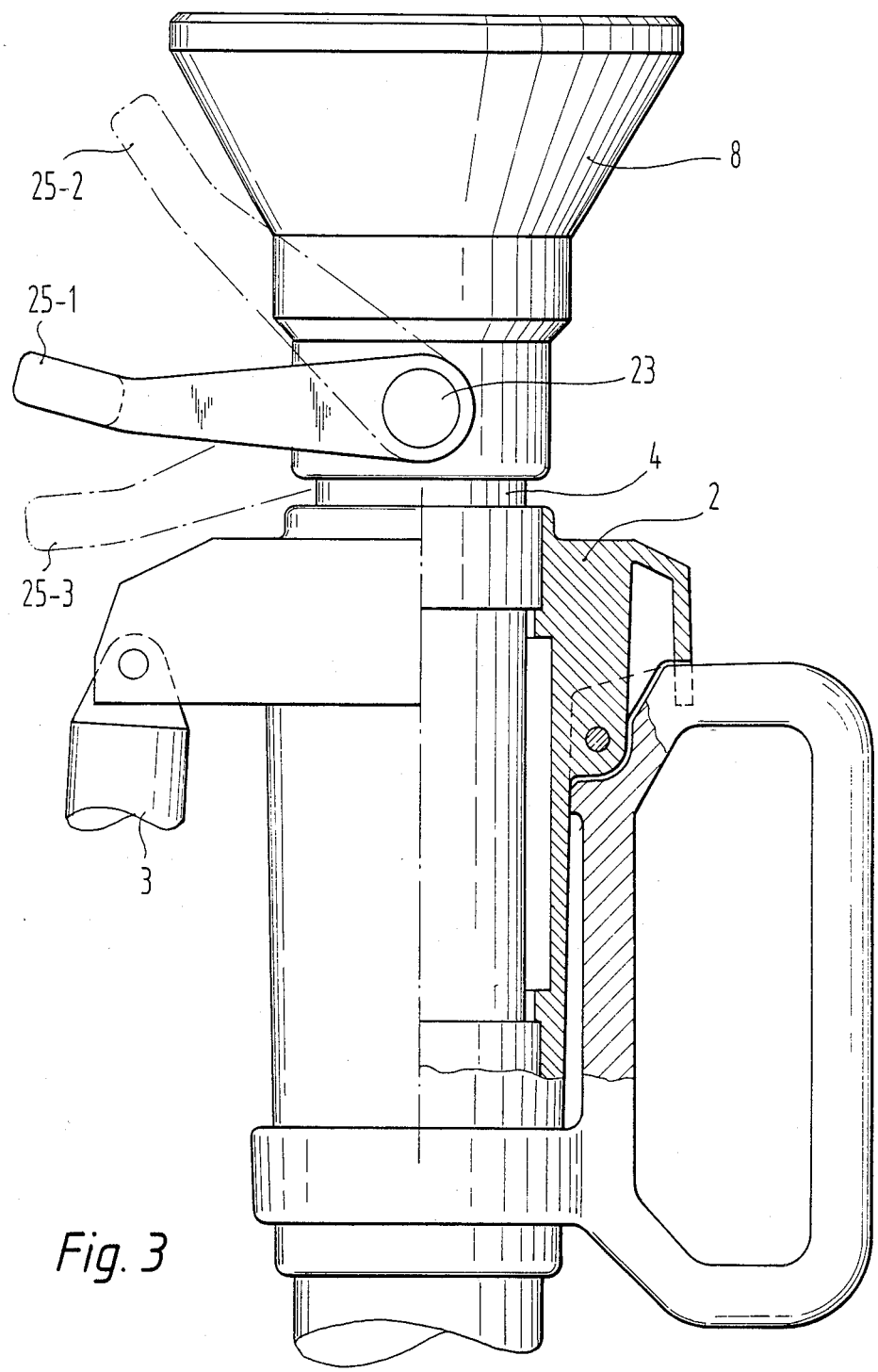
FIG. 3 is a sideview of the portion of the tripod shown in FIG. 2.

To clamp the tripod head 7, it is introduced by its lower semispherical portion 29, which has a central threaded pin 30 at its bottom, in the mounting tray, the threaded pin 30 projecting through the apertures 26, 27 and 28 and engaging the threaded 17 of the threaded coupling 16. The semispherical portion 7 is screwed into the thread 17, a simultaneous rotation of the threaded coupling 16 being prevented by a locking pin not shown, which is introduced through a bore 31 in the attachment into a hole 32 in the threaded coupling 16. When the threaded pin 30 is screwed into the threaded coupling 16, the cup spring stack 13 is partially compressed whereby the pressure member 11 is pressed against the semispherical portion 29. The individual parts of the fastening element 10 are then in the position shown in FIG. 2: The tripod head 7 is firmly clamped, the washer 22 is on the shaft, optionally at the beginning of the eccentric ramps 24, and the strap-shaped handle 25 is in a substantially horizontal position, as indicated in FIG. 3 with 25-1. The strap-shaped handle 25-1 can also be held in this position by a catch not shown, but otherwise it is also upwardly movable in the position 25-2 without there being changed the seat of the tripod head in the mounting tray 8.

To change the position of the tripod head 7 in the mounting tray 8, for instance, for the above indicated purpose of aligning the tripod head horizontally with the aid of a water level guage, the strap-shaped handle 25 is downwardly pivoted in the direction toward the carrier ring 2, as indicated in dotted lines in FIG. 3 with 25-3. During the rotating movement the eccentric ramps 24 run beneath the washer 22 so that the sleeve 19 in FIG. 2 is slightly pushed upwardly; the cup spring stack 13 is thereby further compressed. This creates a small gap between the convex underface 15 of the spacer 14 and the concave surface 18 of the threaded coupling 16, so that the threaded coupling 16 is now freely movable and the semispherical portion 29 can be moved to the new position desired. If this final position is reached, the strap-shaped handle 25 is again transferred from the position 25-3 to the horizontal position 25-1 so that now the spacer 14 and the threaded coupling 16 are pressed against each other and the tripod head 7 is locked in the final position.

The mounting device can obviously be used in combination with other portable or stationary tripods. Other energy reservoirs such as strong helical compression springs can likewise by substituted for the cup spring stack.

I claim:

1. In a tripod comprising a semispherical dish-shaped mounting tray for a tripod head having a semispherical bottom portion for carrying a film or television camera etc. and in the bottom area of said mounting tray a fastening element which has a threaded coupling (16) for engagement with a threaded pin at the bottom of said tripod head and for pressing said tripod head in said mounting tray, the improvement comprising said fastening element (10) being situated in a downwardly oriented attachment (9) of said mounting tray (8) consisting, in sequence, of a pressure member (11) held on the bottom of said mounting tray (8) and having a central aperture (26), a mechanical energy reservoir (13) having a central aperture (27), a spacer (14) having a central aperture (28) and a convex underface (15), the threaded coupling (16) having a concave surface (18) resting on said convex underface (15) of said spacer (14), a sleeve (19) that surrounds said threaded coupling (16) and supports said spacer (14) on its lower edge (20), and a rotatable eccentric (23, 24, 25) acting upon the lower edge (22) of said sleeve (19) and mounted in said attachment (9) of said mounting tray (8).

2. A tripod according to claim 1, wherein said mechanical energy reservoir (13) is a cup spring stack.

3. A tripod according to claim 1, wherein said eccentric (23, 24, 25) has a shaft rotatably supported in said attachment (9) of said mounting tray (8) and having in the area of said lower edge (22) of said sleeve (19) two eccentric ramps (24) and the free ends of said shaft that project from said attachment (9) are connected by a handle, preferably a strap-shaped handle (25).

4. A tripod according to claim 3, wherein between said shaft (23) and said lower edge of said sleeve (19) there is provided a hardened washer (22), which is inserted in a circular groove (21) in said lower edge (22) of said sleeve (19).

5. A tripod according to claim 1, wherein said pressure member (11) is held in said attachment (9) of said mounting tray (8) by a snap ring (12).

* * * * *